J. H. EICHHOLZ.
BALL BEARING CASTER.
APPLICATION FILED MAY 12, 1911.

1,014,582.

Patented Jan. 9, 1912.

Inventor
Joseph H Eichholz

Witnesses
William Smith

By Victor J. Evans
Attorney

UNITED STATES PATENT OFFICE.

JOSEPH H. EICHHOLZ, OF ST. LOUIS, MISSOURI.

BALL-BEARING CASTER.

1,014,582.

Specification of Letters Patent. Patented Jan. 9, 1912.

Application filed May 12, 1911. Serial No. 626,684.

*To all whom it may concern:*

Be it known that I, JOSEPH H. EICHHOLZ, citizen of the United States, residing at St. Louis, in the State of Missouri, have invented new and useful Improvements in Ball-Bearing Casters, of which the following is a specification.

The present invention relates to certain novel and useful improvements in furniture casters, and has particular application to a ball bearing caster adapted to be applied to household furniture, trunks or other articles or furnishings.

In carrying out my invention, it is my purpose to provide a ball-bearing caster embodying in its construction the desired features of simplicity, durability and strength.

It is further my purpose to provide a caster of this type which may be readily and quickly applied to the article of furniture, and furthermore when such article is provided with casters embodying my invention, it may be shifted in any direction desired, without undue labor, inasmuch as the caster ball, engaging the antifriction bearings, offers but little resistance to the floor, and is exceedingly responsive to the slightest force applied to the article of furniture.

I also aim to provide an improved ball caster wherein the antifriction bearings and the caster ball may be rapidly and easily assembled, and when so assembled are held securely in position.

With the above recited objects and others of the similar nature in view my invention consists in the construction, combination, and arrangement of parts set forth in and falling within scope of the appended claims.

Figure 2:
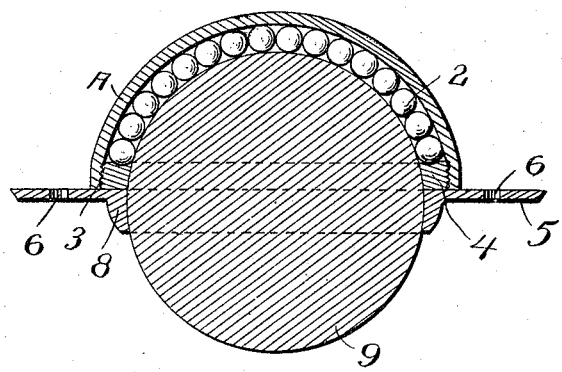
Figure 3:
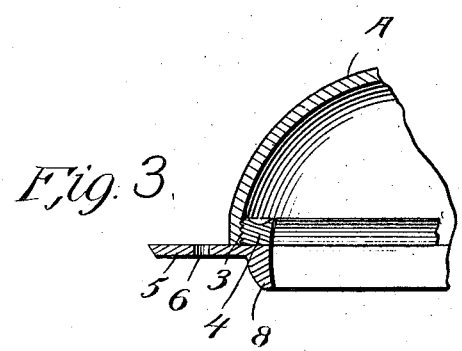
Figure 1:
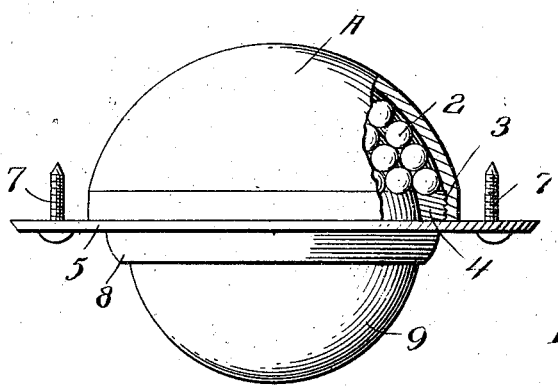

In the accompanying drawings; Figure 1 is a view in elevation of a ball bearing caster embodying my invention, a portion of the wall of the semi-circular cup being broken away to show the ball bearings. Fig. 2 is a vertical sectional view of my improved caster. Fig. 3 is a detail sectional view, showing a portion of the plate, cup and the retainer rings to which the cup is threaded.

Referring now to the accompanying drawings in detail, the letter A designates a cup or socket of approximately semi-circular form which is adapted to receive a suitable number of small balls or other antifriction bearings 2, said socket being threaded at its edge, as at 3 to screw upon the externally threaded ring 4, the latter being carried by the flat plate 5. This plate is provided with the usual apertures 6 for the passage of the screws, or other fastening means 7 by which the casters are secured to the article of furniture, such as the bottom or leg of a table, chair or the like. This plate is provided on its underside with the inwardly tapered flange 8 adapted to act as a retaining means for the caster ball 9.

It will be noted that I have provided an exceedingly simple and efficient form of caster, which may be applied to any article of furniture, or to any article where the use of a caster is desirable, and it will further be seen that when in use my caster will not tear carpets or other floor coverings, or mar the floor, and further that such casters will roll noiselessly and without friction over the surface of the floor.

In assembling the caster the cup or socket is filled with the small ball-bearings, of any selected size, and the large caster ball is then inserted. The cap is then threaded on to the ring 3 carried by the plate 5 and the caster is then ready for use.

What I claim is:

1. A ball bearing caster, comprising a plate, a caster ball retaining ring on the under side of said plate, a threaded ring carried by the upper side of said plate, a ball cup threaded onto said ring and antifriction bearings interposed between the castor ball and the ball cup.

2. A ball bearing caster comprising a flat plate having a caster ball opening therein, a retaining flange for the caster ball on the under side of said plate, a caster ball projecting through said opening and bearing against the retaining flange, a cup or socket for the reception of antifriction ball-bearings, a ring at the upper side of said plate to which the cup is connected, and ball-bearings within the cup and against which the caster ball is adapted to bear.

In testimony whereof I affix my signature in presence of two witnesses.

JOSEPH H. EICHHOLZ.

Witnesses:
Z. GEIST,
H. C. FRETHEY.